United States Patent [19]
Fox

[11] Patent Number: 5,384,837
[45] Date of Patent: Jan. 24, 1995

[54] LINE SWITCH CONTROL CIRCUIT ARRANGEMENT FOR TELEPHONE SUBSET

[75] Inventor: Ronald C. S. Fox, Randwick, Australia

[73] Assignee: Alcatel Australia Limited, Sydney, Australia

[21] Appl. No.: 981,856

[22] Filed: Sep. 4, 1992

[30] Foreign Application Priority Data

Sep. 4, 1991 [AU] Australia ................ PK8166

[51] Int. Cl.6 .................. H04M 1/00; H04M 19/00
[52] U.S. Cl. ............................ 379/165; 379/413
[58] Field of Search ............. 379/355, 413, 361, 387, 379/355, 412, 324, 377, 164, 165, 418

[56] References Cited

U.S. PATENT DOCUMENTS

| | | | |
|---|---|---|---|
| 4,532,382 | 7/1985 | Pommer, II | 379/355 |
| 5,014,308 | 5/1991 | Fox | 379/413 |
| 5,113,434 | 5/1992 | Fox | 379/413 |

FOREIGN PATENT DOCUMENTS

| | | |
|---|---|---|
| 46948/89 | 8/1990 | Australia . |
| 46953/89 | 8/1990 | Australia . |
| 0371558 | 6/1990 | European Pat. Off. . |
| 8700717 | 1/1987 | WIPO . |
| 88/03234 | 10/1988 | WIPO . |

*Primary Examiner*—Stephen Chin
*Assistant Examiner*—Kevin Kim
*Attorney, Agent, or Firm*—Robbins, Berliner & Carson

[57] ABSTRACT

A line switch control circuit for a telephone subset comprising a line switch (2), a hook switch mode detector (TR4), a voltage sensing circuit (TR5) having at least two inputs (D and F), and a dialler chip (3) having a CMOS push-pull pulse output (DP). The circuit ensures that when the subset is in the on-hook mode, on the one hand, an appropriate level of current is drawn from the exchange line (L1, L2) to energise the dialler chip (3), and on the other hand, the line switch (2) remains non-conducting during on-hook mode.

In the off-hook mode, the circuit renders the line switch non-conducting during breaks in dialling signals as well as during flashes by diverting current from the line switch into the pulse output (D) of the dialler chip.

8 Claims, 1 Drawing Sheet

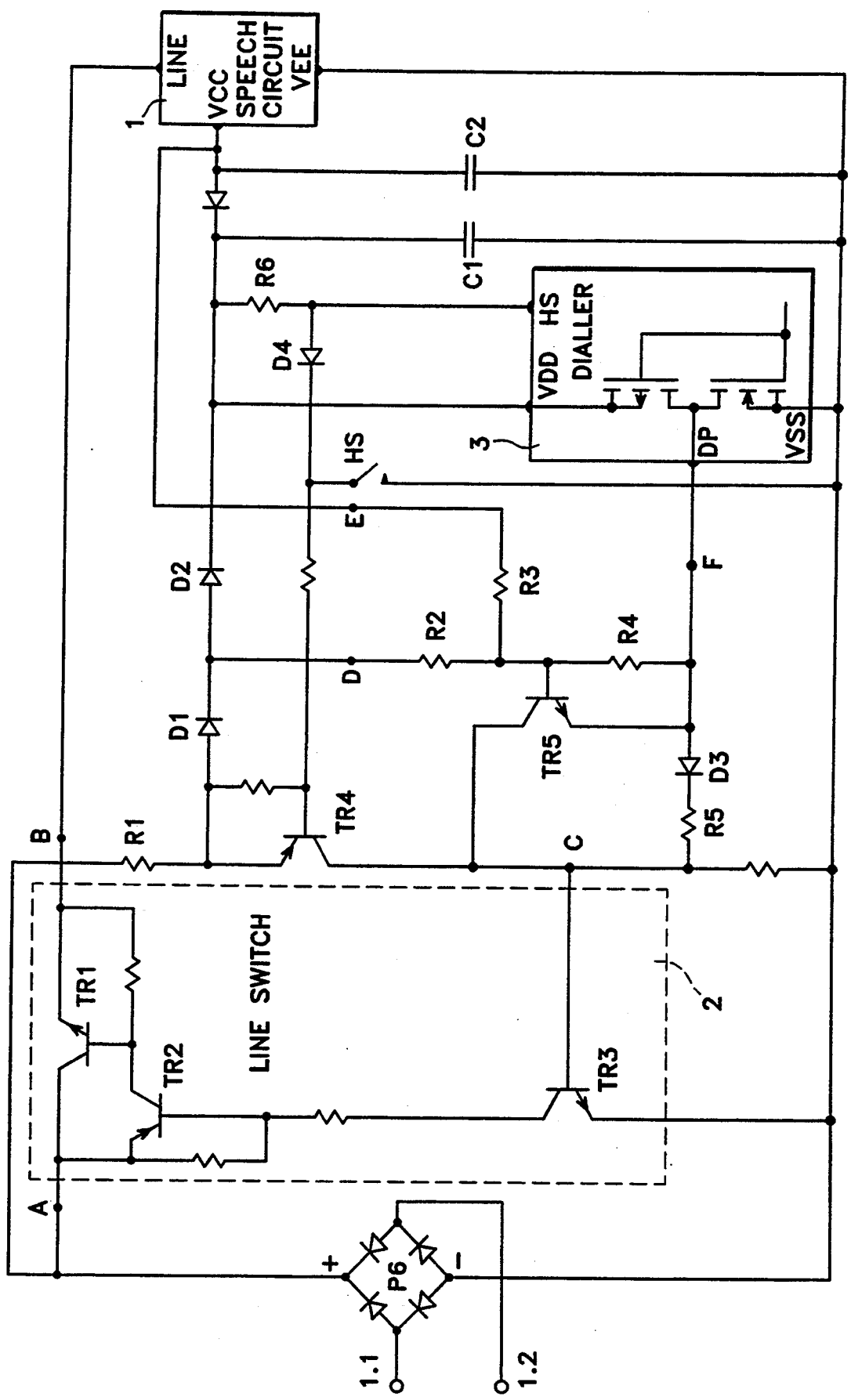

LINE SWITCH CONTROL CIRCUIT ARRANGEMENT FOR TELEPHONE SUBSET

TECHNICAL FIELD

This invention relates to telephone subsets and in particular to telephone subsets incorporating an electronic line switch controlled by a control circuit.

BACKGROUND ART

The electronic line switch fulfils a number of functions including a hook-switch function, that is, the line switch acts as a hook-switch when a hook-switch control signal is selectively applied to the electronic line switch, a hook-switch control signal being generated when the user brings the subset into the off-hook mode. This control signal may, for example, be provided by a ten number repetory tone/pulse dialler chip incorporating a CMOS push-pull dial pulse output.

In a subset provided with a conventional mechanical hook-switch and dialler chip, the dialler chip is provided with its operating power from current derived from the exchange battery and drawn over the exchange line through the operated hook-switch. As soon as the subset is brought into the off-hook mode the hook-switch contact operates and sufficient operating voltage is immediately extended to the dialler chip which can then function.

In the case of a subset provided with an electronic line switch, however, when such a subset is initially connected to an exchange line, or re-connected after subsequently being un-plugged, the dialler chip would be without power because its power source is cut off by the very line switch it controls. Consequently the dialler chip would be unable to function and the line switch could not be signalled. Therefore it is necessary in such a case to provide control circuitry to ensure that on the one hand at least a mimumun operating voltage be provided for the dialler chip when the subset is in the on-hook mode, and on the other hand the line switch remains off in the on-hook mode and that the only current drawn from the exchange line is a small bleed current which does not exceed a predetermined value, typically 50 µA.

In the specification of Australian Patent No. 606397 (which corresponds to International (PCT) application PCT/AU88/00046), which was published by WIPO under publication number WO 88 08 234 and which is hereby incorporated by reference, there is described a circuit for providing initial power to a dialler chip associated with a telephone subset having an electronic line switch of the aforementioned type. This known circuit comprises a controllable semiconductor switch controlled by a control circuit, which switches the electronic line switch on when the control circuit senses that the voltage on the dialler chip's power terminals is below a predetermined voltage, and allows a storage capacitor coupled across the power terminals to be charged by line current flowing via the operated line switch. The controllable semiconductor switch switches the line switch off when the voltage across the capacitor rises to a predetermined magnitude sufficient to allow the dialler chip to provide hook-switch signals to the line switch.

A disadvantage of the aforementioned known circuit is that when the subset is connected in parallel with a low voltage modem the data transmission from the modem is corrupted by noise generated in the control circuit of the subset which charges the storage capacitor coupled across the dialler chip's power terminals. Another disadvantage of the aforementioned known circuit is that the number of circuit elements therein make it relatively expensive.

It is an object of the present invention to provide a telephone subset line switch control circuit which ensures that the line switch remains off when the subset is in the on-hook mode, and current from the exchange line is coupled via a bleed circuit means to maintain the subset's dialler chip's normal operating voltage.

It is a further object of the present invention to provide a telephone subset line switch control circuit which ensures that when the voltage across the dialler chip's power terminals is below the minimum operating voltage, the operation of the hook-switch to take the subset into the off-hook mode causes line current to be diverted into the line switch's control element so that the line switch allows sufficient current to be drawn therethrough to provide minimum operating voltage to be applied to the power terminals of the dialler chip.

It is a further object of the present invention to provide a telephone subset line switch control circuit which will turn the line switch on fully and quickly when the subset is brought off-hook, except during hook-switch flash and dialling break periods whereupon the line switch is fully off.

It is a further object of the present invention to provide a telephone subset line switch control circuit which includes means to maintain the dialler chip's memory for at least a predetermined minimum period after disconnection from the exchange line.

It is a further object of the present invention to provide a telephone subset line switch control circuit which does not corrupt data transmitted by a device connected in parallel with the said subset.

It is a further object of the present invention to prevent current leakage within the line switch control circuit from activating the line when the subset is in the on-hook mode.

It is a further object of the present invention to provide a telephone subset line switch control circuit which comprises relatively few circuit components.

According to the present invention, in a telephone subset comprising a first and a second line terminal means for respectively connecting to conductors of an exchange line; a speech circuit means connected between the line terminal means; a line switch means whose switching element is formed by a conductive path of a first controllable semiconductor switch means having a control element coupled to a line switch control terminal means, said switching element being serially connected in the said subset's loop current circuit; and a dialler circuit means having power supply terminal means, a hook-switch terminal means coupled to hook-switch contact means, and a signal output terminal means, a method for controlling said first controllable semiconductor switch means comprising the steps of:

(a) deriving current from the exchange line with a current bleed circuit means to maintain a first predetermined voltage across said power supply terminals when said hook-switch is in the on-hook mode to partially energize said dialler circuit means.

(b) detecting an off-hook condition of said hook-switch with a second controllable switch means which is rendered conducting thereby.

(c) directing current from said exchange line into said line switch control terminal means via said second controllable semiconductor switch means to allow sufficient current to flow through the said conductive path of said first controllable semiconductor switch means to charge a first storage capacitor means to a second predetermined voltage for fully energizing said dialler circuit means, whereupon said first controllable semiconductor switch means is saturated and more current flows through said conductive path of the first controllable semiconductor switch means whereby said first storage capacitor means is charged to a third predetermined voltage.

(d) providing a third controllable semiconductor switch means arranged to be rendered conducting upon detection of said third predetermined voltage together with detection of a break signal condition on said signal output terminal means of said dialler circuit means, thereby diverting current from said exchange line into said signal output terminal means and rendering said first controllable semiconductor switch means non-conducting thereby breaking the said subset's loop current circuit.

(e) provide a second storage capacitor means to maintain a voltage equivalent to said first predetermined voltage across said power supply terminals for a predetermined minimum period when said line terminal means are subsequently disconnected from said conductors of the exchange line.

According to a further aspect of the present invention there is provided a telephone subset comprising a first and a second line terminal means for respectively connecting to conductors of an exchange line; a speech circuit means connected between the line terminal means; a line switch means whose switching element is formed by a conductive path of a first controllable semiconductor switch means having a control element coupled to a line switch control terminal means, said switching element being serially connected in the said subset's loop current circuit; and a dialler circuit means having power supply terminal means, a hook-switch terminal means coupled to hook-switch contact means, and a signal output terminal means, wherein said subset further includes a current bleed circuit means for deriving current from the exchange line to maintain a first predetermined voltage across said power supply terminals when said hook-switch is in the on-hook mode to partially energize said dialler circuit means; a second controllable switch means which is rendered conducting upon detecting an off-hook condition and directing current from said exchange line into said line switch control terminal means via said second controllable semiconductor switch means to allow sufficient current to flow through the said conductive path of said first controllable semiconductor switch means to charge a first storage capacitor means to a second predetermined voltage for fully energizing said dialler circuit means, whereupon said first controllable semiconductor switch means is saturated and more current flows through said conductive path of the first controllable semiconductor switch means whereby said first storage capacitor means is charged to a third predetermined voltage; a third controllable semiconductor switch means arranged to be rendered conducting upon detection of said third predetermined voltage together with detection of a break signal condition on said signal output terminal means of said dialler circuit means, thereby diverting current from said exchange line into said signal output terminal means and rendering said first controllable semiconductor switch means non-conducting thereby breaking the said subset's loop current circuit; a second storage capacitor means maintaining a voltage equivalent to said first predetermined voltage across said power supply terminals for a predetermined minimum period when said line terminal means are subsequently disconnected from said conductors of the exchange line.

Preferably, the second controllable switch means is a transistor controlled by the hook-switch contacts, although this arrangement could be substituted by an additional set of hook-switch contacts.

BRIEF DESCRIPTION OF DRAWINGS

In order that the invention may be readily carried into effect, an embodiment thereof will now be described in relation to the single figure of the drawing showing part of a telephone subset circuit incorporating the line switch control arrangement of the present invention.

BEST MODE FOR CARRYING OUT THE INVENTION

Referring to the drawing, the circuit comprises line terminals L1 and L2 connected across a polarity guard device in the form of a diode bridge PG; a speech circuit 1, such as, for example, a Philips TEA 1061 and including a filter capacitor C2 typically 100 uf, coupled to the line terminals; a semiconductor line switch 2 comprising a complementary pair of switching transistors TR1 and TR2, whose switching path is coupled to an input terminal A and an output terminal B, and a switch control transistor TR3 whose control element is coupled to a control terminal C; a dialler chip 3 of the type incorporating a CMOS push-pull dial pulse output (DP), such as, for example, an OKI MSM6052; a storage capacitor C1, typically 1000uf, coupled across the power supply terminals VDD and VSS of dialler chip 3, for storing power to energise the dialler chip's memory when the subset is disconnected from the exchange line; a hook-switch HS shown in the on-hook state; a hook-switch operation detector in the form of transistor TR4; and a voltage sensing circuit comprising a transistor TR5, resistors R2, R3, R4 and R5, diode D3, and three input terminals D, E and F.

In operation, with the subset in the on-hook mode, current flows from the exchange line via line terminal L1, resistor R1, diodes D1 and D2 to the power terminal VDD of dialler chip 3 to maintain the voltage across the power terminals VDD-VSS within a range sufficient for the operation thereof. Diodes D1 and D2 provide a "supply voltage" of about 1 volt which is always available to power transistor TR4 whether the subset is in the on-hook mode and irrespective of the charge on storage capacitor C1.

When the subset is taken off-hook the contacts of hook-switch HS close and transistor TR4 is turned on. The voltages at terminals D and E of the voltage sensing circuit are below a predetermined threshold, typically 3 volts, and therefore transistor TR5 is held off. Virtually all of the current from transistor TR4 flows into the base of transistor TR3 in the line switch switching on transistors TR1 and TR2 sufficiently to charge capacitor C2 up to and beyond the minimum voltage required to operate speech circuit 1 and dialler chip 3. When the voltage across the power terminals VDD and VSS of dialler chip 3 rises above the minimum operating voltage, and since the HS input of the dialler chip 3 is held LOW by the operated hook-switch HS and diode D4, the DP output of the dialler chip 3 goes HIGH. This condition causes the base of transistor TR3 to receive more current via diode D3 and resistor R5, saturating it and thereby turning on transistors TR1 and TR2 fully.

Dialling commands from an associated keypad (not shown) cause the condition on DP to go LOW during break periods or flashes. This LOW is detected by the voltage sensing circuit at terminal F and current flows from capacitor C2 via resistors R3 and R4 whose resistance ratio is such that a voltage of 0.5 volts is applied to the base of transistor TR5 which turns on. Current from transistor TR4 is then diverted from the base of transistor TR3 into the DP pin of dialler chip 3 causing transistor TR3 to turn off thereby turning off transistors TR1 and TR2.

When the subset is brought into the on-hook mode transistor TR4 is turned off by hook-switch HS. Transistor TR5 is kept on by current that flows through resistor R2, and clamps the base of transistor TR3 to the DP pin of dialler chip 3 which is in the LOW condition because the HS pin is held HIGH by the charge on capacitor C1 via resistor R6. This prevents leakage current from collector to base of transistor TR3 from activating the line switch.

When the subset is on-hook and disconnected from the exchange line, the only significant drain on the charge or storage capacitor C1 is the dialler chip 3.

While the present invention has been described with regard to many particulars it is understood that equivalents may be readily substituted without departing from the scope of the invention.

The claims defining the invention are as follows:

1. In a telephone subset comprising a first and second line terminal means for respectively connecting to conductors of an exchange line; a speech circuit means connected between the line terminal means; a line switch means whose switching element is formed by a conductive path of a first controllable semiconductor switch means having a control element coupled to a line switch control terminal means, said switching element being serially connected in the said subset's loop current circuit; and a dialler circuit means having power supply terminal means, a hook-switch terminal means coupled to hook-switch contact means of a hook-switch, and a signal output terminal means, a method for controlling said first controllable semiconductor switch means comprising the steps of:

deriving current from the exchange line with a current bleed circuit means to maintain a first predetermined voltage across said power supply terminals when said hook-switch is in the on-hook mode to partially energize said dialler circuit means;

detecting an off-hook condition of said hook-switch with a second controllable semiconductor switch means which is rendered conducting thereby;

directing current from said exchange line into said line switch control terminal means via said second controllable semiconductor switch means to allow sufficient current to flow through the said conductive path of said first controllable semiconductor switch means to charge a first storage capacitor means to a second predetermined voltage for fully energizing said dialler circuit means, whereupon said first controllable semiconductor switch means is saturated and more current flows through said conductive path of the first controllable semiconductor switch means whereby said first storage capacitor means is charged to a third predetermined voltage;

rendering a third controllable semiconductor switch means conducting upon detection of said third predetermined voltage together with detection of a break signal condition on said signal output terminal means of said dialler circuit means, thereby diverting current from said exchange line into said signal output terminal means and rendering said first controllable semiconductor switch means nonconducting thereby breaking the said subset's loop current circuit; and using a second storage capacitor means to maintain a voltage equivalent to said first predetermined voltage across said power supply terminals for a predetermined minimum period when said line terminal means are subsequently disconnected from said conductors of the exchange line.

2. A method as claimed in claim 1, wherein said step of detecting an off-hook condition of said hook-switch comprises the steps of providing, via operating said hook-switch, a first voltage condition to said hook-switch terminal means, and producing a second voltage condition at said signal output terminal means to render said first controllable semiconductor switch means fully conducting.

3. A method as claimed in claim 2, wherein said step of rendering said third controllable semiconductor switch means conducting includes the steps of producing a voltage condition substantially equivalent to said first voltage condition at said signal output terminal means when the dialler circuit means selectively generates loop interrupt signals, and applying said so produced voltage condition to a control element of said third controllable semiconductor switch means to render it conducting, and thereby divert current from said third controllable semiconductor switch means into said signal output terminal means to thereby render said first controllable semiconductor switch means non-conducting during loop interrupt signals.

4. A method as claimed in claim 3, further comprising the steps of maintaining the first controllable semiconductor switch means non-conducting when said hook-switch is in the on-hook mode, providing said second voltage condition on said hook-switch terminal means when said hook-switch is in the on-hook mode, providing said first voltage condition at said signal output terminal means, and clamping a control element of said first controllable semiconductor switch means to said signal output terminal via said third controllable semiconductor switch means to maintain said first controllable semiconductor switch means nonconducting.

5. In a telephone subset comprising a first and a second line terminal means for respectively connecting to conductors of an exchange line:

a speech circuit means connected between the line terminal means;

a line switch means whose switching element is formed by a conductive path of a first controllable semiconductor switch means having control element coupled to a line switch control terminal means, said switching element being serially connected in the said subset's loop current circuit;

a dialler circuit means having power supply terminal means, a hook-switch terminal means coupled to hook-switch contact means, and a signal output terminal means;

a current bleed circuit means for deriving current from the exchange line to maintain a first predetermined voltage across said power supply terminals when said hook-switch is in the on-hook mode to partially energize said dialler circuit means;

a second controllable switch means which is rendered conducting upon detecting an off-hook condition and directing current from said exchange line into said line switch control terminal means via said second controllable semiconductor switch means to allow sufficient current to flow through the said conductive path of said first controllable semiconductor switch means to charge a first storage capacitor means to a second predetermined voltage for fully energizing said dialler circuit means, whereupon said first controllable semiconductor switch means is saturated and more current flows through said conductive path of the first controllable semiconductor switch means whereby said first storage capacitor means is charged to a third predetermined voltage;

a third controllable semiconductor switch means arranged to be rendered conducting upon detection of said third predetermined voltage together with detection of a break signal condition on said signal output terminal means of said dialler circuit means, thereby diverting current from said exchange line into said signal output terminal means and rendering said first controllable semiconductor switch means non-conducting thereby breaking the said subset's loop current circuit; and a second storage capacitor means maintaining a voltage equivalent to said first predetermined voltage across said power supply terminals for a predetermined minimum period when said line terminal means are subsequently disconnected from said conductors of the exchange line.

6. A telephone subset as claimed in claim 5, wherein said current bleed circuit includes serial diode means arranged to provide a voltage supply to said second controllable switch means to provide power to said second controllable switch means when said subset is in either the on-hook or the off-hook mode.

7. A telephone subset as claimed in claim 6, wherein said third controllable semiconductor switch means includes a control element coupled to a plate of said first storage capacitor means for detecting said third predetermined voltage, said control element being further coupled to said signal output terminal means of said dialler circuit means.

8. A telephone subset as claimed in any one of claim 7, wherein said dialler circuit means incorporates a CMOS push-pull dial pulse output means.

* * * * *